Jan. 2, 1945.   H. H. FRANCISCO   2,366,509
ELECTRICAL CONTACTOR FOR WIRE OR SHEETS
Filed Oct. 9, 1942   5 Sheets-Sheet 1
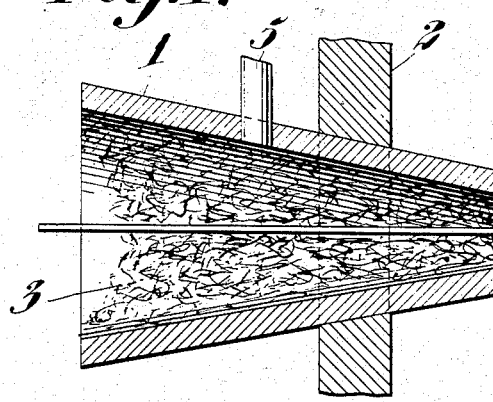
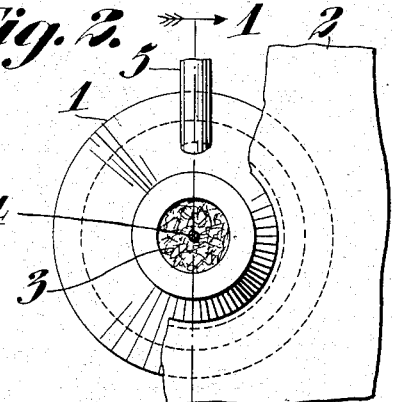
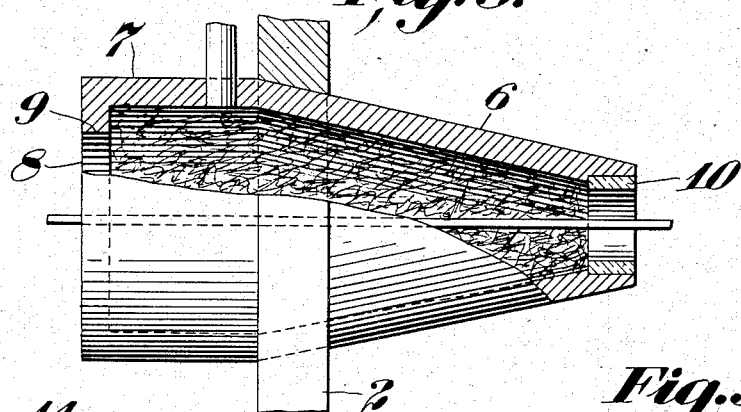
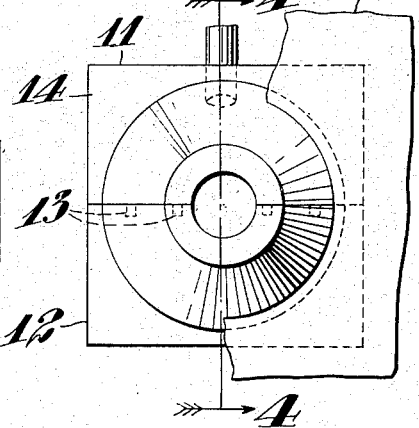
Inventor
Herbert H. Francisco,
By R. S. A. Dougherty.
Attorney Jan. 2, 1945.  H. H. FRANCISCO  2,366,509
ELECTRICAL CONTACTOR FOR WIRE OR SHEETS
Filed Oct. 9, 1942    5 Sheets-Sheet 2
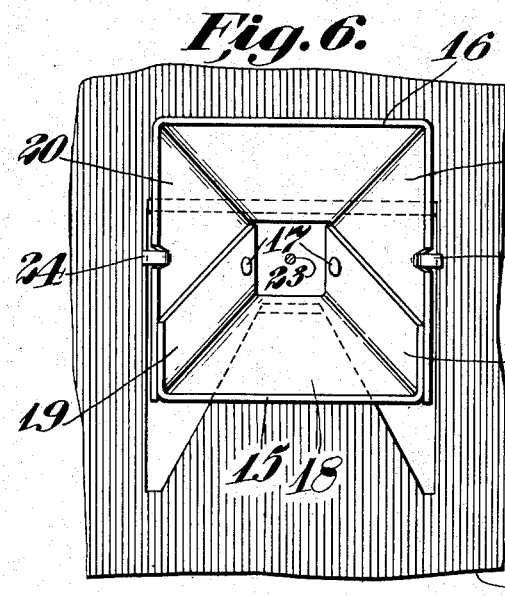
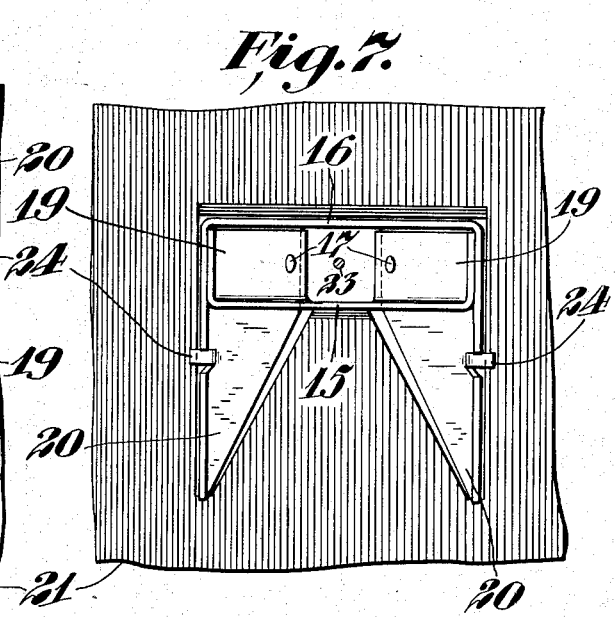
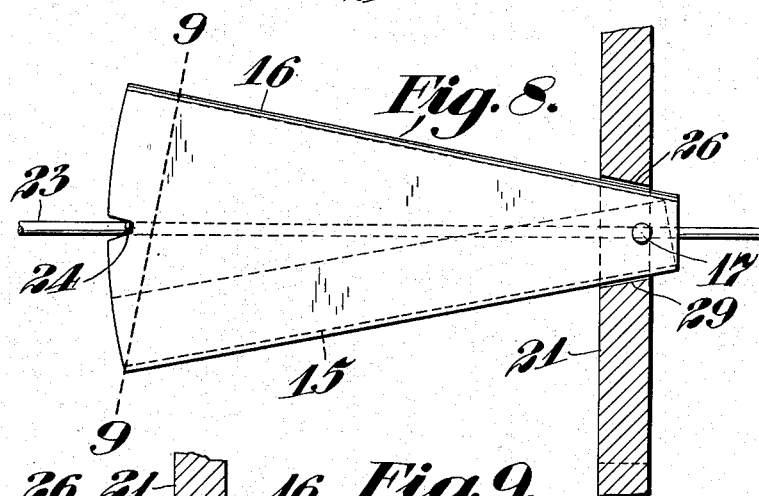
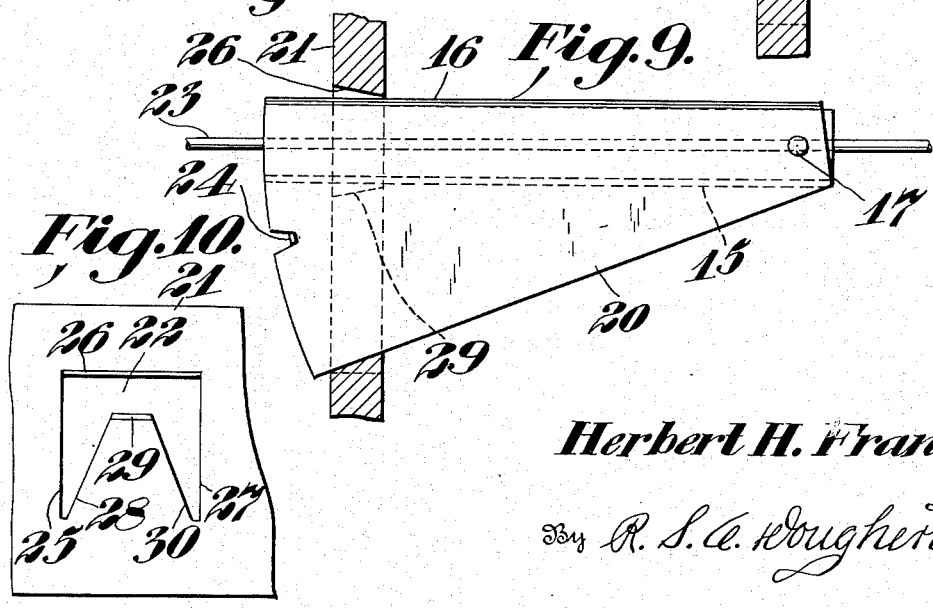
Inventor
Herbert H. Francisco.
By R. S. C. Dougherty.
Attorney Jan. 2, 1945.  H. H. FRANCISCO  2,366,509
ELECTRICAL CONTACTOR FOR WIRE OR SHEETS
Filed Oct. 9, 1942  5 Sheets-Sheet 3
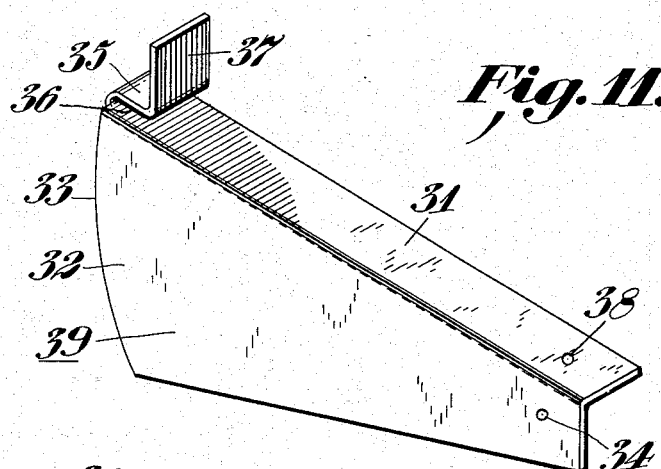
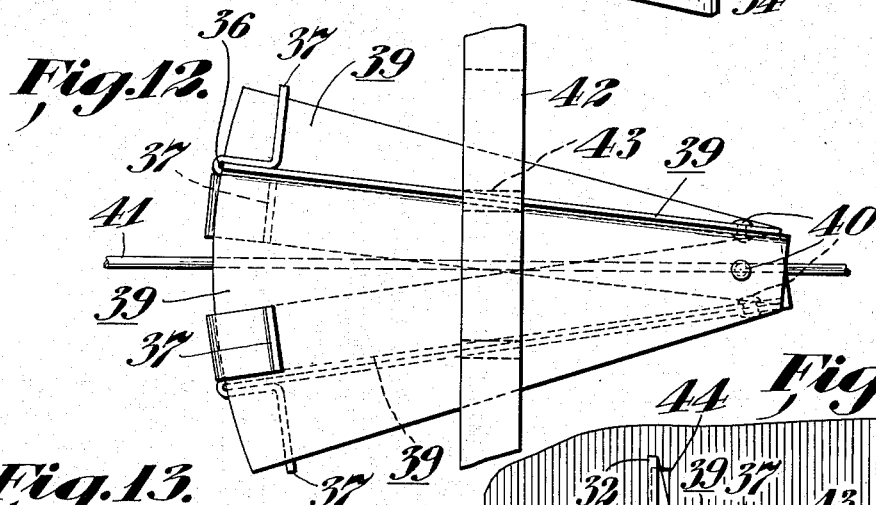
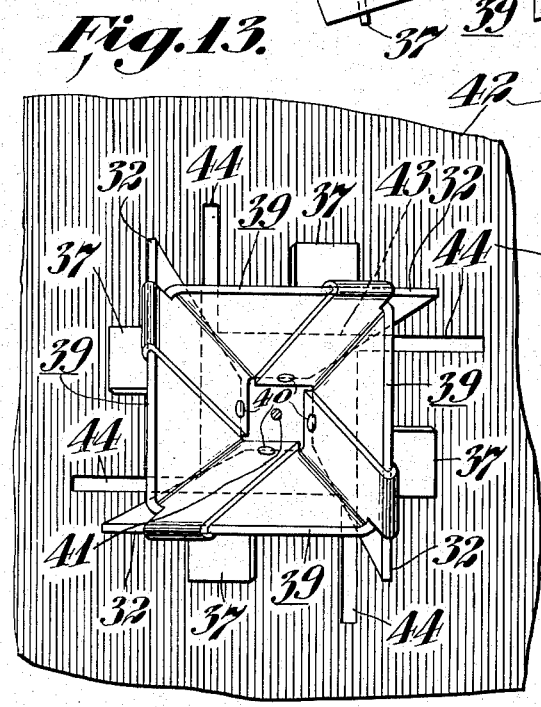
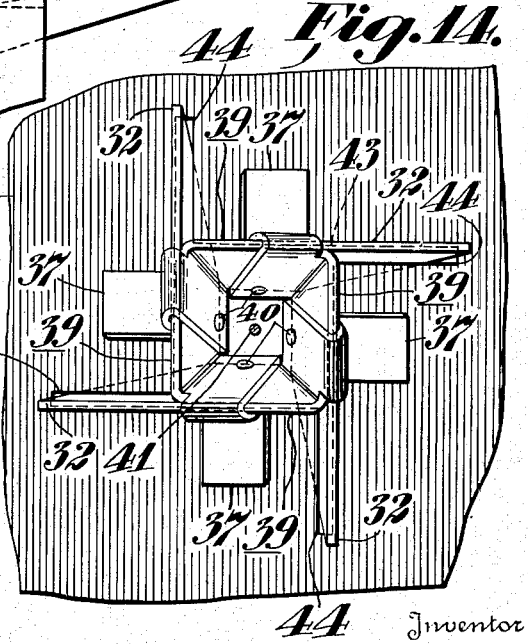
Inventor
Herbert H. Francisco.
By R. S. C. Dougherty.
Attorney

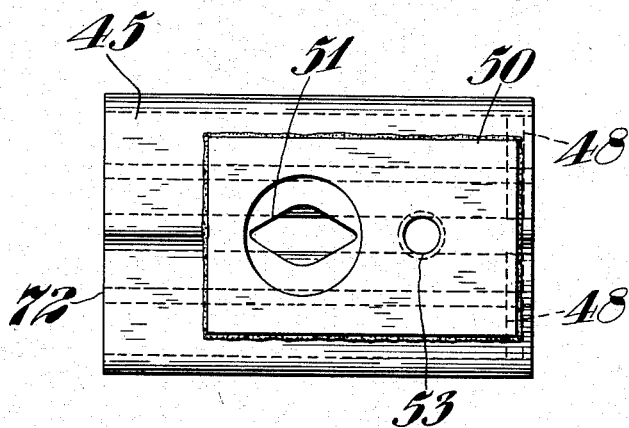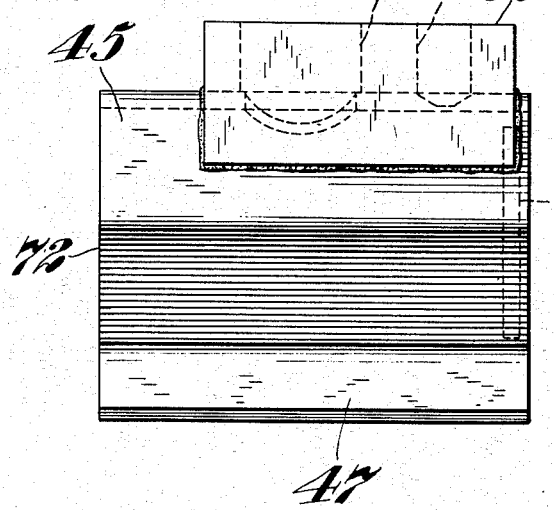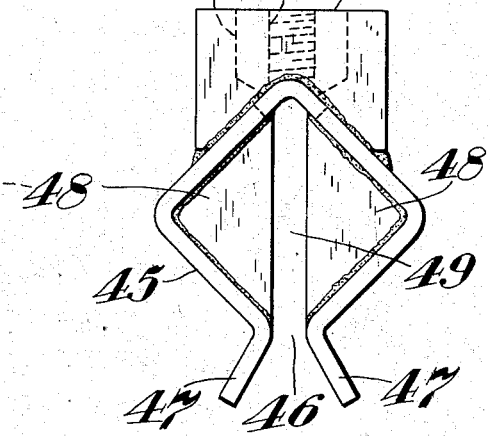

Jan. 2, 1945.   H. H. FRANCISCO   2,366,509
ELECTRICAL CONTACTOR FOR WIRE OR SHEETS
Filed Oct. 9, 1942   5 Sheets-Sheet 5

Inventor
Herbert H. Francisco
By R. S. A. Dougherty
Attorney

Patented Jan. 2, 1945

2,366,509

UNITED STATES PATENT OFFICE 2,366,509

ELECTRICAL CONTACTOR FOR WIRE OR SHEETS

Herbert H. Francisco, Bethlehem, Pa., assignor to Bethlehem Steel Company, a corporation of Pennsylvania Application October 9, 1942, Serial No. 461,492

15 Claims. (Cl. 191—1)

This invention comprises a method of making electrical contact with wires or any elongated metal article such as sheet or strip material in electroplating processes or in any other process wherein it is necessary to pass electricity through a moving elongated metal article.

Various types of rolling and sliding contacts have been devised for contacting moving elongated articles but all have the objections of excessive wear and unreliable contact. In this invention these problems are successfully solved. A firm and positive contact is maintained at all times and a contacting material is used which exhibits splendid wearing qualities. This contacting material also has the advantages of being easily replaced and inexpensive.

The main object of my invention therefore, is to maintain a positive and reliable electrical contact with a moving elongated metal article.

A second object is to make sliding anodic contact with a moving elongated article in electrolytic treatments.

Another object is to make possible the employment of a contacting material which has excellent wearing qualities and also is highly resistant to corrosive liquids such as are used in the electroplating of wire.

Another object is to provide a contacting apparatus in which the contacting material may be readily renewed.

Other objects and advantages of this invention will be evident to those skilled in this art from the description of the invention which follows.

To aid in the description and to be considered a part of the specification of this invention the following drawings are included.

Figure 1 is a section taken along line 1—1 of Fig. 2 of one form of this invention.

Fig. 2 is an end view of the device a section of which is shown in Fig. 1.

Fig. 3 is a side view of another form of my invention with part cut away and sectioned.

Fig. 4 is a section of still another form of this invention taken along line 4—4 of Fig. 5.

Fig. 5 is an end view of the device a section of which is shown in Fig. 4.

Fig. 6 is an end view of an automatic adjustable form of this invention, the apparatus being in open position.

Fig. 7 is the apparatus of Fig. 6 in closed position.

Fig. 8 is a side view of Fig. 6.

Fig. 9 is a side view of Fig. 7.

Fig. 10 is a front view of a stationary insulating holding block which forms a portion of the apparatus of Figs. 6 to 9.

Fig. 11 is a perspective view of a part of another automatic adjustable form of this invention.

Fig. 12 is a side view of an assembled automatic adjustable type of Fig. 11.

Fig. 13 is an end view of the device shown in Fig. 12 showing the device in open position.

Fig. 14 is an end view of the device shown in Fig. 12, showing the device in closed position.

Figs. 15, 16 and 17 are the end view, side view, and top view, respectively, of another form of this invention.

Figure 18:
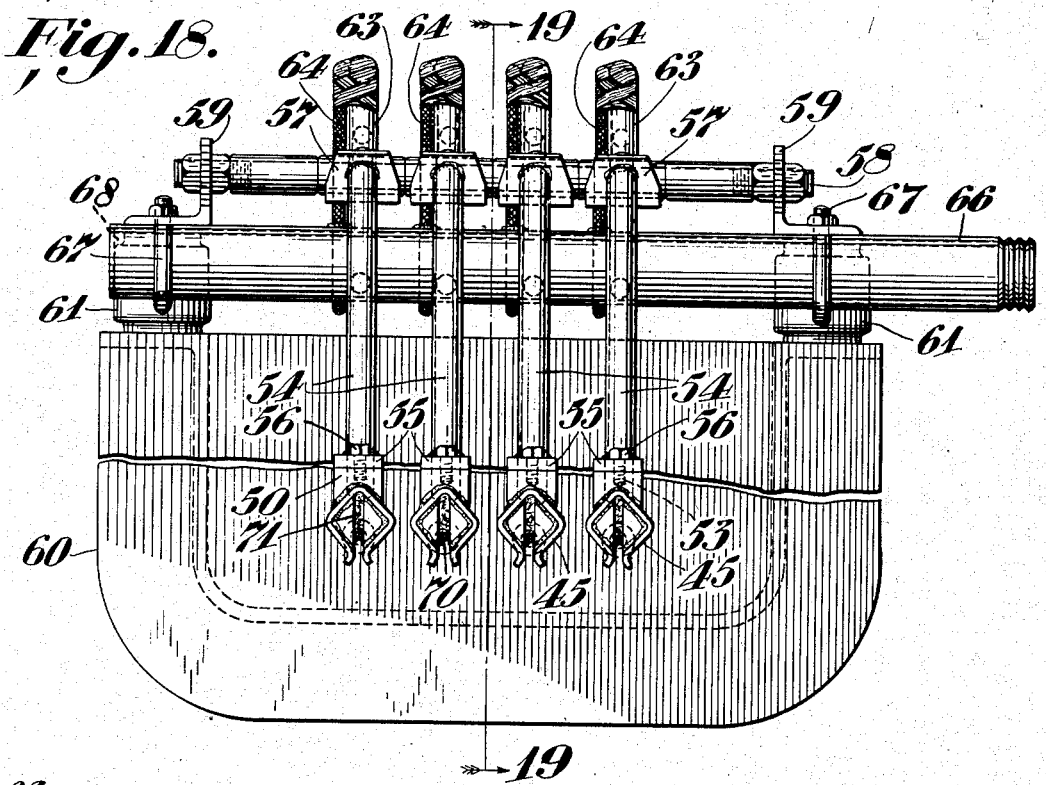
Figure 19:
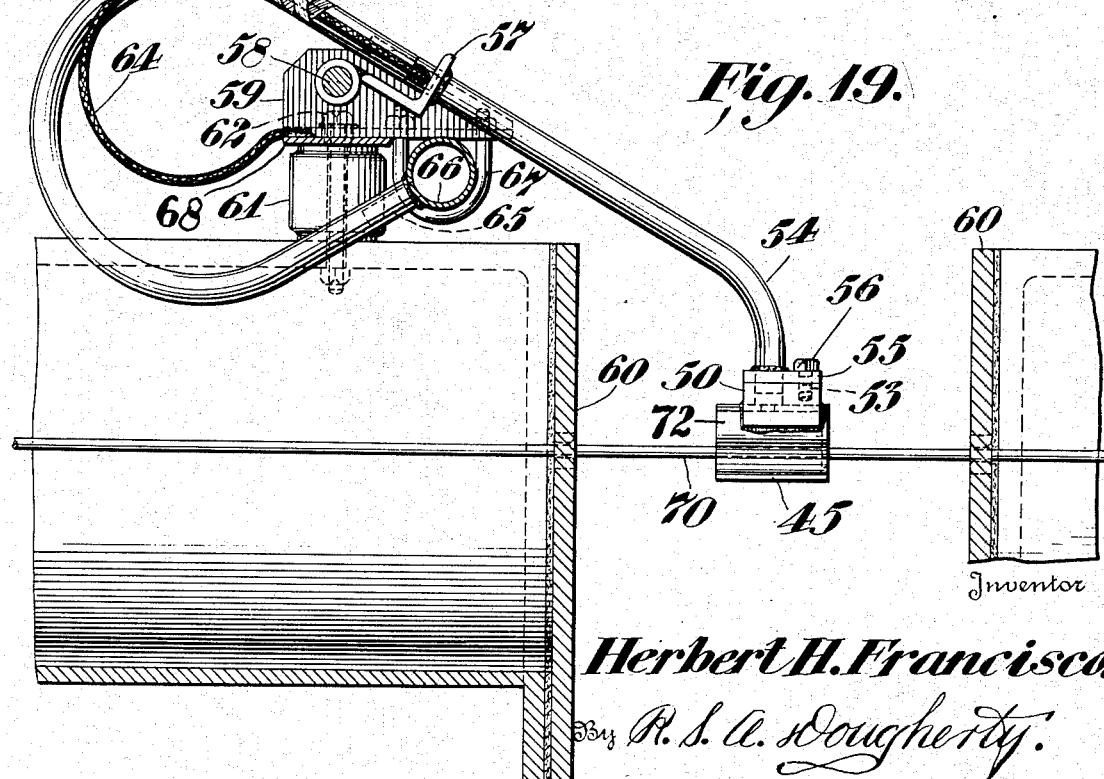

Figs. 18 and 19 show the contactor of Figs. 15, 16, and 17 mounted in operative position on a typical wire electroplating unit, Fig. 18 being an end view of four contactor units and Fig. 19 is a section taken along line 19—19 of Fig. 18.

A simple form of this invention is shown in Figs. 1 and 2. This consists of a frusto-conical tube 1 open at both ends. This tube is inserted in a frusto-conical hole smaller than the larger end of the tube in a stationary supporting block 2. This supporting block may be made of either conducting or insulating material whichever is preferred.

If the block 2 is made of a conducting material such as metal it can serve as the electrical connection to an external source of current. To make certain of a positive connecton with this block it is advisable to weld or braze the tube 1 in position. If the block is of insulating material the movement of the wire produces sufficient pressure to hold the tube 1 in the proper position. To make electrical connection to the tube when the block 2 is of insulating material a wire can be brazed or soldered to the tube 1.

The tube is filled with metal wool 3 such as steel, monel, stainless steel, bronze, copper, or any other metal wool. The wire 4 to be contacted is passed through this frusto-conical tube from the larger or entrance end toward the smaller or exit end. Due to the action of frictional contact between the wire and the metal wool the wool is compacted against the converging walls of the tube and a firm contact is established between the wool and the wire as the wire is drawn through. Likewise a firm and positive electrical contact is maintained between the metal wool and the walls of the tube. This also holds the conical tube firmly in place in the supporting block 2. The exit end opening may be made quite large without any objectionable loss of metal wool due to the fibrous nature of this material. To rinse, lubricate, and cool the wire and wool, a cylindrical tube 5 is inserted in a hole in the top portion of the frusto-conical tube through which water or other lubricants may be fed.

The ease with which rinsing, lubricating, and cooling the metal wool is performed in this apparatus adds to its efficiency and usefulness especially in the electroplating field. Due to this it is possible to use much higher current densities than under prior art methods. Also it affords a method of cleaning the contacting material by periodically flushing with water or any other suitable liquid.

Electricity is supplied to the contactor from any suitable source. In the electroplating of wire this contactor will act as the negative contact so that the wire will be the cathode. If the wire is to be anodically cleaned then the contactor will be the positive contact. It will depend on the application as to whether it is negative or positive. It is even feasible to use two contactors, such as would be needed in heating a portion of a moving wire by electricity.

One of the problems encountered in making anodic contact to wire or other similar articles has been that of electro-chemical wear, that is, the contacting material would be worn away in an unbelievably short time due principally to electrolytic action. This difficulty is eliminated by using this new type of contactor. It appears that the resilient character of the contacting surface, that is, the metal wool, is greatly superior to any surface previously devised for operating under the condition encountered in making anodic contact in electrolytic solutions.

This type of contactor is particularly efficient in the electrolytic treatment of materials anodically because it affords a means of increasing the speed of treatment. Using a plurality of these contactors, one can be positioned between each pair of adjacent tanks in a series of electrolytic tanks for anodic treatment of materials. In this way a high current density of the order of 1000 amperes per square foot of wire surface can be effectively and efficiently maintained and as a result the speed of treatment can be greatly increased.

A modification of this contactor is shown in Fig. 3. In this modification, in addition to the frusto-conical tubular portion 6, a cylindrical portion 7 is provided which forms an extension of the larger end of the frusto-conical tube. This cylindrical part 7 acts as a reservoir for the metal wool by providing a larger space in which to store it. The opening 8 in the cylindrical part 7 is restricted by the inward projecting circular flange 9 to help retain the stored wool. At the smaller or exit end a porcelain ring insert 10, or a ring insert of any wear resisting material, is placed to reduce wear at the sides of the exit.

A third form of contactor is shown in Figs. 4 and 5. This is a split form, the frusto-conical tube being split longitudinally into two parts 11 and 12. Pins 13 are provided for properly aligning the parts 11 and 12. This enables the contactor to be removed while the wire is in motion or without removing the wire from other operations which are being performed on it. A collar 14 is provided for abutment against the supporting block 2 to aid in retaining the contactor sections in place.

The automatic adjustable type shown in Figs. 6 to 14 act upon the same principle except that the contactor itself is movable. In these the contactor takes the form of a frusto-pyramid in which the sides are movable transverse to the axis of the wire. This transverse movement is effected by sliding longitudinal movement of the contactor through the stationary supporting block as a result of the forward pressure caused by the frictional engagement of the wire with the contacting material. This transverse movement will cause greater compacting of the wool and a resultant firm contact with the wire.

One automatic movable form is shown in Figs. 6 to 9. It consists of two parts 15 and 16 pivoted at points 17.

Parts 15 and 16 are formed from sheet metal into the forms shown. Part 15 is substantially a channel with the web 18 in the shape of an isosceles trapezoid and with the rectangular flanges 19 extending from the sloping sides of the web. Part 16 is a channel of similar shape except that the flanges 20 are not rectangles. The shapes of these flanges are identical to the web except that the base line is an arc described about the pivot point 17 as a center. Part 15 is made small enough so that the flanges 19 fit between flanges 20 of part 16. Holes are provided in the flanges of both parts at the small end of the channel section to form the pivot point 17 about which the two parts may rotate with respect to each other. Thus part 15 moves about pivot point 17 so that when in the position shown in Fig. 6, that is, with the plane of the web 18 coinciding with the plane of the outer edges of the flanges 20, the two members 15 and 16 will form a frusto-pyramid. This is known as the open position. Figure 8 shows a side view of the open position.

The closed position is as shown in Figs. 7 and 9. In this member 15 has rotated upward about pivot points 17 and member 16 has rotated downward until the outer edges of flanges 19 are abutting against the web of member 16, the enclosed space being a frustrum of a wedge.

The opening and closing of members 15 and 16 is accompanied by longitudinal movement of the contactor through the stationary supporting block 21, a front view of which is shown in Figure 10. The opening 22 in block 21 is so formed that it will cause the closing of the members 15 and 16 as the contactor slides through it. Complete passage through the opening 22 in the direction of movement of the wire 23 is prevented by the tabs 24 cut and bent outward from the curved edges of flanges 20.

The outer perimeter of opening 22, defined by edges 25, 26 and 27, corresponds to a transverse section of member 16 taken along line 9—9 of Figure 8 at right angles to the web of member 16 and intersecting the outer corners of flanges 20. The inner perimeter, defined by edges 28, 29 and 30, corresponds to the projection of the outer edges of the flanges 20 and the small end edge of web 18 on a plane perpendicular to the web of member 16 when the members are in closed position. The edges 26 and 29 of opening 22 are cut at an obtuse angle to the entrance side plane of block 21 to accommodate the slope of the webs when the contactor is in full open position as shown in Figure 8.

In operation the contactor is filled with metal wool when in the full open position as shown in Figures 6 and 8. As the wire passes through the wool it forces the wool forward which in turn presses against the contactor causing forward movement of it. Forward movement of the contactor results in a transverse movement of the members 15 and 16 and a consequent compacting of the metal wool about the wire. One specific advantage of this movable type is that the transverse compacting action will keep more of the surface of the wire in contact with the wool at all times because wearing away of the wool will cause a forward movement of both the contactor and wool in this type whereas just movement of the wool occurs in the stationary type.

Another form of automatic adjustable contactor is shown in Figures 11 to 14. In this type all four sides are movable transverse to the direction of wire movement thereby always maintaining the enclosed space in the shape of a regular pyramidal frustum until completely closed when the enclosed space becomes a regular prism. To enable movement of all four sides requires four separate identical members such as shown in Figure 11.

This member is formed from one piece of sheet metal bent into an angle one leg 31 of which is a rectangle and the other 32 an isosceles trapezoid the base of which is an arc 33 whose center is the pivot point 34. The adjoining sides of the two legs are one long side of leg 31 and a sloping side of leg 32. On the small end of leg 31 adjacent the edge 33 of leg 32 is an extension 35 which is bent 180° back parallel to leg 31 forming a groove 36 with sufficient space to pass sheet metal of the same thickness as the member. The end of this extension 35 is then bent at right angles away from the leg 31 to form a stopping tab 37. A pivot hole 38 is provided at the opposite end of leg 31.

Four such members 39 are then assembled to form the contactor shown in Figures 12, 13 and 14. They are assembled such that the leg 32 of each member slides in the groove 36 of the adjacent member and the pivot hole 34 of leg 32 is aligned by means of a pivot pin 40 with the pivot hole 38 of leg 31 of this same adjacent member thereby permanently securing and interlocking the four members together. This construction will permit smooth simultaneous movement of the four members about their respective pivot pins 40 transverse to the axis of wire 41.

This contactor operates in conjunction with the stationary supporting block 42 through the opening 43. This opening comprises a square large enough to accommodate the assembled contactor when completely closed. The square has at each corner a slit 44 one side of which is an extension of one side of the square and each slit projects at right angles to the slits at adjacent corners and is parallel to the slit at the diagonal corners. These slits accommodate the legs 32 when the assembled contactor is in closed position as shown in Figure 14.

To begin operations the contactor is initially filled with metal wool while in the open position and then a wire 41 is passed through it as shown in Figures 12 and 13. The movement of the wire is begun with a resultant compacting of the wool and a slight movement longitudinally of the contactor. This produces a transverse movement of the four side members with a consequent further compacting of the metal wool. Thus the wire is firmly contacted. As the metal wool wears the contactor moves longitudinally thus preventing accumulation of the wool at the exit end and providing a larger surface of contact over a greater proportion of the time. When the contactor reaches closed position further longitudinal movement in the direction of the moving wire is prevented by the tabs 37.

Figures 15 through 19 show the preferred form of this invention which embodies the basic principles and includes several features in addition to those disclosed in Figs. 1 to 14 inclusive. This type of contactor is readily removable from the wire being contacted and thereby facilitates the replenishing of the metal wool. In Figs. 15, 16 and 17 this type comprises a square tube 45 of copper or other suitable metal with its longitudinal axis horizontal and with its vertical axis passing through two diagonally opposed corners, the lower one of which is opened for the full length of the tube as shown at 46 with two flanges 47 bent outwardly.

At one end of tube 45 in the other two opposed corners are brazed or welded, or secured in any suitable manner, two triangular shaped pieces 48 such that they form a vertical slot 49 equal to the width of the opening 46 in the lower corner. This forms the exit end of the contactor. The open end 72 of tube 45 serves as the entrance end. Astride the top corner of the tube is a block 50 which is shaped to fit the tube and is brazed thereto. Through block 50 and tube 45 is a hole 51 by means of which water for cooling, lubricating and flushing the metal wool and the wire being contacted is provided. That portion of the hole 51 through the tube 45 is drilled before forming the tube which therefore gives it the shape shown at 52 in Figure 17. The threaded hole 53 provides means for securing the assembled contactor to the supporting tubular rod 54 shown in Figure 19.

In Figure 18 is shown a group of four of these contactors mounted for use in a typical wire electroplating apparatus and in Figure 19 is shown a contactor in side elevation in contact with a wire. In this, each contactor fits against a plate 55 which is brazed to a supporting rod 54 and is held thereto by a bolt 56 screwed through plate 55 into threaded hole 53. This method of securing the tube 45 provides a convenient means for unmounting it quickly. The ends of supporting rod 54 pass through holes in brackets 57 and are secured thereto by brazing. Each bracket is pivotally supported by rod 58. This rod 58 is in turn supported by angle-brackets 59 which are suitably mounted on the sides of tank 60 on insulators 61 and are held in place by bolts 62.

To the upper end of each tubular rod 54 a flexible tube 63 of rubber or similar water impervious material is attached. Also at this point is brazed a heavy current carrying conductor 64 of copper or other high conductivity material. Each of the flexible tubes 63 have their opposite ends suitably attached to short tubes 65 protruding from the water supply pipe 66 which is supported by means of U-bolts 67 from the brackets 59. The other ends of conductors 64 are brazed to the bus bar 68 which is also supported on the insulators 61.

To prepare for operation the group of contactors being swung upward about rod 58 so that the square tubes 45 can be filled with metal wool or any other compressible conducting material down to the opening 46, are allowed to swing downward until the wire 70 has passed between the flanges 47 and the wire is in contact with the metal wool 71. Thus the contactor rides on the wire 70 and is held there by gravity. The longitudinal movement of the wire 70 which enters the end 72 and leaves through the slot 49 forces the metal wool against the triangular pieces 48 which close all but the slot 49 at the exit end of the square tube 45. Likewise the vertical pressure of the contactor due to gravity forces the metal wool upward into the converging top portion of the tube 45. Consequently this double acting compression of the metal wool produces a firm positive contact between the metal wool and the article.

It is not necessary to depend on gravity alone for the vertical pressure as a spring or a pneumatic pressure device could be used to supplement gravity and it would also afford more positive control over the contactor. The contactor could also contact the article from below by using a pneumatic or a hydraulic device to obtain the required vertical pressure.

The electrical circuit consists of the bus bar 68, the conductor 64, the supporting rod 54, the plate 55, block 50, square tube 45, and the metal wool. All these items are preferably made of copper except the metal wool which as related previously is preferably of a non-corrosive electrically conductive material. However the rod 54 could be formed of an insulating material and the conductor 64 then could be extended down to contact the tube 45 directly.

During operation, water or other suitable liquid is fed from supply pipe 66 through flexible tube 63, tubular rod 54, and hole 51 to lubricate and cool the contacting surfaces. This also serves as a flushing device to remove any debris that may collect in the wool.

In all the contactors described the metal wool can be readily renewed when the supply within the contactor is worn down to a certain minimum amount which will depend on the current capacity required. Replacement can be performed without undue difficulty in any type of contactor shown while the wire or other material being contacted is in motion. In the case of electrolytic treatment of the contacted material the voltages are such that it is not necessary to interrupt the main current flow in the circuit while the replacement is being made.

This invention has been described as applied to wire but it should not be limited thereto as any moving elongated metallic article of substantially constant cross-section may be contacted by this means. For instance, it is possible to contact moving strip material which is substantially wider than it is thick by widening one of the dimensions of the openings of either of the two adjustable type contactors or by forming a stationary type with a suitable rectangular opening.

It should be understood that the invention is not limited to the wool holder being made of metal as it is possible to form these holders of some plastic or other non-conducting material and by means of a small metal plate attached to the inner surface of the holder to establish electrical contact with the metal wool.

It should also be understood that while metal wool is the preferred material any finely divided compressible electrically conductive material may be used if it possesses the required wearing qualities. It is not always necessary that it be corrosion resistant because in some applications there are no corrosive liquids present.

The preferred embodiments of my invention have been described in this specification, but the invention should not be limited thereto as there are numerous modifications which will fall within its scope. Therefore, only such limitations shall be placed upon this invention as are imposed by the prior art or as are specifically set forth in the appended claims.

Having thus described my invention, what I claim as new and desire to secure by Letters Patent is:

1. An apparatus for electrically contacting an elongated moving metal article comprising a mass of compressible, electrically conducting material surrounding said article in slidable engagement therewith for a short portion of its length and conducting means slidably engaging the conducting material for retaining said material in engagement with said article, the walls of said conducting means converging in the direction of movement of said article to define a restricted area towards the exit end of said conductor whereby movement of said mass of material into the restricted area by the moving article causes said mass of conducting material to be continuously retained under compression.

2. An apparatus for electrically contacting a moving wire comprising a mass of metal wool surrounding said wire in sliding engagement therewith for a short portion of its length and conducting means slidably engaging said wool for retaining said wool in engagement with said wire, the walls of said conducting means converging in the direction of movement of said wire to define a restricted area towards the exit end of said conducting means whereby movement of said wool into the restricted area by the moving wire causes compacting of said wool between said conducting means and said article.

3. An apparatus for electrically contacting a moving elongated metal article comprising a mass of compressible, electrically conducting material surrounding said article in slidable engagement therewith for a short portion of its length and conducting means slidably engaging said material and having a restricted area for retaining said material in engagement with said article, the shape of said conducting means being such that movement of said article causes compacting of said material into the restricted area in said conducting means whereby a firm and reliable electrical contact is made between said article and said conducting means.

4. An apparatus for electrically contacting a moving elongated metal article comprising a mass of compressible, electrically conducting material surrounding said article in slidable engagement therewith for a short portion of its length, conducting means slidably engaging said material and retaining said material in engagement with said article, said conducting means comprising movable walls adapted to approach each other to compress said material between said article and said conducting means during the movement of said article to provide a firm and reliable contact between the conducting means and said article.

5. An apparatus for making an electrical contact with a moving elongated metal article comprising a mass of compressible, electrically conductive material surrounding said article in sliding engagement therewith for a short portion of its length, retaining means slidably engaging said material and comprising walls for retaining said material in engagement with said article, the walls of said retaining means converging in the direction of movement of said article, and conducting means restraining movement of said retaining means whereby movement of said article through said retaining means causes increased compression of said material to provide a firm and reliable contact between said retaining means and said article.

6. An apparatus for electrically contacting a moving elongated metallic article comprising a mass of compressible, electrically conductive material surrounding said article in sliding engagement therewith for a short portion of its length, compacting means slidably engaging said material and retaining said mass in engagement with said moving article, and conducting means cooperating with said compacting means to progressively compress said mass about said article upon movement of said article through said mass whereby a firm and positive electrical contact is made between said article and said conducting means.

7. An apparatus for making an electrical contact with a moving elongated metallic article comprising a frusto-conical metal tube, means for holding said tube against longitudinal movement in the direction of movement of said article and compressible, electrically conducting material filling said tube and adapted to be moved by the movement of said article through said material from the larger to the smaller end of said tube to retain the conducting material under compression to provide a firm and positive electrical contact between said article and said material.

8. An apparatus for making an electrical contact with a moving wire comprising a frusto-conical metal tube open at both ends through which said moving wire passes, a stationary block holding said tube in a stationary position and metal wool filling said tube whereby movement of said wire from the larger to the smaller end of said tube through said metal wool causes compacting of said wool by the movement of said wool toward said smaller end and establishes a firm and positive electrical contact between said wire and said wool.

9. An apparatus for electrically contacting an elongated moving metallic article comprising a mass of compressible, electrically conductive material surrounding said article and in sliding engagement therewith, a frusto-pyramidal metal container retaining the mass under compression about said article, said container having interlocking movable sides capable of movement transversely to the longitudinal axis of said article and towards said article, and supporting means having a restricted passage slidably supporting said container and adapted to cause the sides of said container to move towards each other and compress the mass of conducting material in contact with said article upon the movement of the container through the passage by the article.

10. An apparatus for establishing electrical contact with a moving wire comprising a mass of metal wool surrounding said wire for a short portion of its length, a frusto-pyramidal metal container for retaining said mass in compact slidable engagement with said wire, said container being open at both ends and having movable sides in interlocking sliding relationship and having pivot points common to adjacent sides at the small end of said container, said sides adapted to move about said pivot points transverse to the axis of said wire, a stationary holder in which said container is slidably retained, said container adapted upon movement of said wire through said mass to slide in said holder whereby said sides move towards said wire and causes compacting of said mass in said container and firm and positive contact between the mass and the wire.

11. An apparatus for passing electricity through a moving elongated metallic article comprising a mass of compressible, electrically conductive material surrounding said article for a short portion of its length, a frusto-conical metal tube surrounding said material and in slidable engagement therewith and retaining said material in sliding engagement with said article, said tube being split longitudinally through its axis into two separable sections, and means for holding said tube substantially stationary against longitudinal movement in its assembled relation with its smaller end extending in the direction of movement of said moving article during movement of said article through said tube, whereby the mass of material is urged towards the smaller end of said tube during the movement of said article through said tube, thereby compacting said mass of material intermediate the tube and the article and providing a firm contact between said tube and said article.

12. An apparatus for making electrical contact with an elongated moving metallic article comprising a mass of compressible, electrically conductive material substantially surrounding and in slidable engagement with a short portion of said article, a metallic tube slidably engaging said material and having its longitudinal axis parallel to the longitudinal axis of said article for retaining and compacting said mass about said article, said tube having a longitudinal opening of sufficient size to permit the entrance of said article, blocking portions at one end of said tube defining a vertical slot to permit passage of said article but to retain and compact said mass in said tube.

13. An apparatus for electrically contacting a moving wire comprising a tubular conductor arranged so that when in operative position the axis of said conductor is substantially parallel to said wire, a mass of metal wool filling said contactor, an entrance opening at one end of said conductor, an exit opening at the opposite end of said conductor restricted to a vertical slot of such size that said wire can pass therethrough but said wool is retained, a longitudinal slot in the lower surface of said conductor, continuous with said exit slot and by means of which said conductor can straddle said moving wire, a supporting bar for said conductor and a stationary horizontal rod to which said bar is pivotally attached so that said conductor can be moved only vertically in an arc about said rod whereby when said conductor is swung downward until it straddles said moving wire, a firm and reliable electrical contact is made and maintained between said wire and metal wool.

14. An apparatus for electrically contacting a moving member comprising a tubular conductor in its operative position having its axis substantially parallel to the moving member, a mass of metal wool filling said conductor, said conductor having an entrance opening, and an exit opening restricted to a vertical slot of such size that said moving member can pass therethrough while retaining the wool within the conductor, said conductor having a longitudinal slot in its lower surface continuous with the slot of the exit opening to permit the conductor to straddle the moving member, a stationary horizontal member, a supporting bar for said conductor pivotally connected to said horizontal member for vertical movement arcuately about said rod whereby when said conductor is swung downward to straddle said moving member, a firm and reliable electrical contact is made between said moving member and said metal wool.

15. An apparatus for electrically contacting a moving elongated metallic article, comprising a support, an arm, contacting means mounted on one end of said arm, said arm having its other end pivotally mounted on said support and adapted to permit movement of the contacting means in a vetrical arc, said contacting means comprising a hollow rectangular prism and compressible electrically conductive material loosely disposed within said prism, said prism having a longitudinal slot in its lower surface extending from end to end thereof to permit said prism to straddle said article, said prism having an entrance end to permit entrance of said article and an exit end to permit exit of said article, the exit end of said prism being partially obstructed to permit exit of said article and retention of said material.

HERBERT H. FRANCISCO.